United States Patent [19]
Kouno

[11] Patent Number: 6,009,968
[45] Date of Patent: *Jan. 4, 2000

[54] CONTROL APPARATUS METHOD FOR FOUR-WHEEL DRIVE VEHICLE

[75] Inventor: Kazuyuki Kouno, Sagamihara, Japan

[73] Assignee: Nissan Motor Co., Ltd., Yokohama, Japan

[ * ] Notice: This patent is subject to a terminal disclaimer.

[21] Appl. No.: 08/735,551

[22] Filed: Oct. 23, 1996

[30] Foreign Application Priority Data

Oct. 31, 1995 [JP] Japan .................................... 7-283924

[51] Int. Cl.[7] ................................................. B60K 17/344
[52] U.S. Cl. ............................. 180/248; 180/233; 701/89
[58] Field of Search ............................... 701/89; 180/233, 180/248, 249, 250, 247

[56] References Cited

FOREIGN PATENT DOCUMENTS

1-204826 8/1989 Japan .

Primary Examiner—Daniel G. DePumpo
Attorney, Agent, or Firm—Foley & Lardner

[57] ABSTRACT

In control apparatus and method for a four-wheel drive vehicle, when the vehicle in which two tire wheels having different radii from those of originally equipped tire wheels are mounted as either front tire wheels or rear tire wheels is running at a speed exceeding a reference speed (approximately, 40 km/h), a rate of distribution of an engine driving force between mainly driven tire wheels and auxiliarily driven tire wheels set on the basis of a rotation speed difference between the mainly and auxiliarily driven tire wheels ($\Delta V_W$) is modified so that the driving force distributed to the auxiliarily driven tire wheels can be maintained constantly at its minimum limit so as to prevent a control hunting of the driving force distribution to the auxiliarily driven tire wheels based on the rotation speed difference from occurring.

14 Claims, 7 Drawing Sheets

CONTROL APPARATUS METHOD FOR FOUR-WHEEL DRIVE VEHICLE

BACKGROUND OF THE INVENTION

The present invention relates to a control apparatus and method for a four-wheel drive vehicle in which an engaging force of a frictional clutch is varied so that a rate of a distribution of a driving force between front and rear tire wheels of the vehicle is controlled.

SUMMARY OF THE INVENTION

It is an object of the present invention to provide a control apparatus and method for a four-wheel drive vehicle in which control hunting over a rate of a distribution of a driving force can be sufficiently suppressed in a feed back control system of the rate of the driving force distribution. The control hunting is suppressed on the basis of a rotation speed difference between mainly driven tire wheels and auxiliarily driven tire wheels, even if tires having different tire radii than a standard the equipment are mounted on either a front or rear tire wheel drive shaft in place of standard tires.

The above-described object can be achieved by providing a control apparatus for a four-wheel drive vehicle, said four-wheel drive vehicle having mainly driven tire wheels which are either one of front tire wheels or rear tire wheels and auxiliarily driven tire wheels which are the others of either the front tire wheels or the rear tire wheels, said control apparatus comprising:

driving force distribution adjustment mechanism having a frictional clutch arranged for receiving a control signal according to which an engaging force thereof is controlled so that a distribution of a driving force from a vehicular engine to said mainly driven tire wheels and to said auxiliarily driven wheels is carried out;

a first sensor arranged for detecting a rotation speed of one of the mainly driven tire wheels;

a second sensor arranged for detecting a rotation speed of one of the auxiliarily driven tire wheels;

a third sensor arranged for detecting a running speed of the vehicle; and a control unit arranged for determining a tire wheel rotation speed difference in the rotation speed of the mainly driven tire wheel from that of the auxiliarily driven tire wheel detected by said first and second sensors, setting a rate of the distribution of the driving force between the mainly driven tire wheels and the auxiliarily driven tire wheels on the basis of the determined difference in the rotation speed of the tire wheel so that, as the determined difference increases, the rate of the distribution of the driving force to the auxiliarily driven tire wheels increases, outputting a control signal indicating the set rate of the distribution toward the frictional clutch so as to control the engaging force of the frictional clutch on the basis of the set rate of distribution of the driving force to the auxiliarily driven tire wheels, and modifying the set rate of the distribution of the driving force to the auxiliarily driven tire wheels according to the detected running speed of the vehicle.

The above-described object can also be achieved by providing a control apparatus for a four-wheel drive vehicle, said four-wheel drive vehicle having mainly driven tire wheels which are either one of front tire wheels or rear tire wheels and auxiliarily driven tire wheels which are the others of either the front tire wheels or the rear tire wheels, said control apparatus comprising:

driving force distribution adjustment mechanism having a frictional clutch arranged for receiving a control signal according to which an engaging force thereof is controlled so that a distribution of a driving force from a vehicular engine to said mainly driven tire wheels and to said auxiliarily driven wheels is carried out;

a first sensor arranged for detecting a rotation speed of one of the mainly driven tire wheels;

a second sensor arranged for detecting a rotation speed of one of the auxiliarily driven tire wheels;

a third sensor arranged for detecting a running speed of the vehicle; and a control unit arranged for determining a tire wheel rotation difference in the rotation speed of the mainly driven driven tire wheel to that of the auxiliarily driven tire wheel detected by said first and second sensors, setting a rate of the distribution of the driving force between the mainly driven tire wheels and the auxiliarily driven tire wheels on the basis of the determined difference in the rotation speed of the tire wheel so that, as the determined speed difference increases, the rate of the distribution of the driving force to the auxiliarily driven tire wheels increases, outputting the control signal toward the frictional clutch so as to control the engaging force of the frictional clutch on the basis of the set rate of distribution of the driving force to the auxiliarily driven tire wheels, setting a first reference running speed ($V_{WF1}$) exceeding a vehicular low running speed, and modifying the set rate of the distribution so that the driving force distributed to the auxiliarily driven tire wheels is maintained constantly at its minimum value when the vehicle is running at a speed equal to or above the first reference running speed.

The above-described object can also be achieved by providing a control method for a four-wheel drive vehicle, said four-wheel drive vehicle having mainly driven tire wheels which are either one of front tire wheels or rear tire wheels and auxiliarily driven tire wheels which are the others of either the front tire wheels or the rear tire wheels and a driving force distribution adjustment mechanism having a frictional clutch arranged for receiving a control signal according to which an engaging force thereof is controlled so that a distribution of a driving force from a vehicular engine to said mainly driven tire wheels and to said auxiliarily driven wheels is carried out, said control method comprising the steps of;

a) detecting a rotation speed of one of the mainly driven tire wheels;

b) detecting a rotation speed of one of the auxiliarily driven tire wheels;

c) detecting a running speed of the vehicle;

d) determining a tire wheel rotation speed difference from the rotation speed of the auxiliarily driven tire wheel to that of the mainly driven tire wheel;

e) setting a rate of the distribution of the driving force between the mainly driven tire wheels and the auxiliarily driven tire wheels on the basis of the determined difference in the rotation speed of the tire wheels so that, as the determined difference increases, the rate of the distribution of the driving force to the auxiliarily driven tire wheels increases;

f) outputting the control signal toward the frictional clutch so as to control the engaging force of the frictional clutch on the basis of the set rate of distribution of the driving force to the auxiliarily driven tire wheels;

g) setting a first reference running speed ($V_{WF1}$) exceeding a vehicular low running speed; and h) modifying the set rate of the distribution so that the driving force distributed to the auxiliarily driven tire wheels is maintained constantly at its minimum limit when the vehicle is running at a speed equal to or above the first reference running speed.

BEST MODE FOR CARRYING OUT THE INVENTION

Reference will hereinafter be made to the drawings in order to facilitate a better understanding of the present invention.

Figure 1:
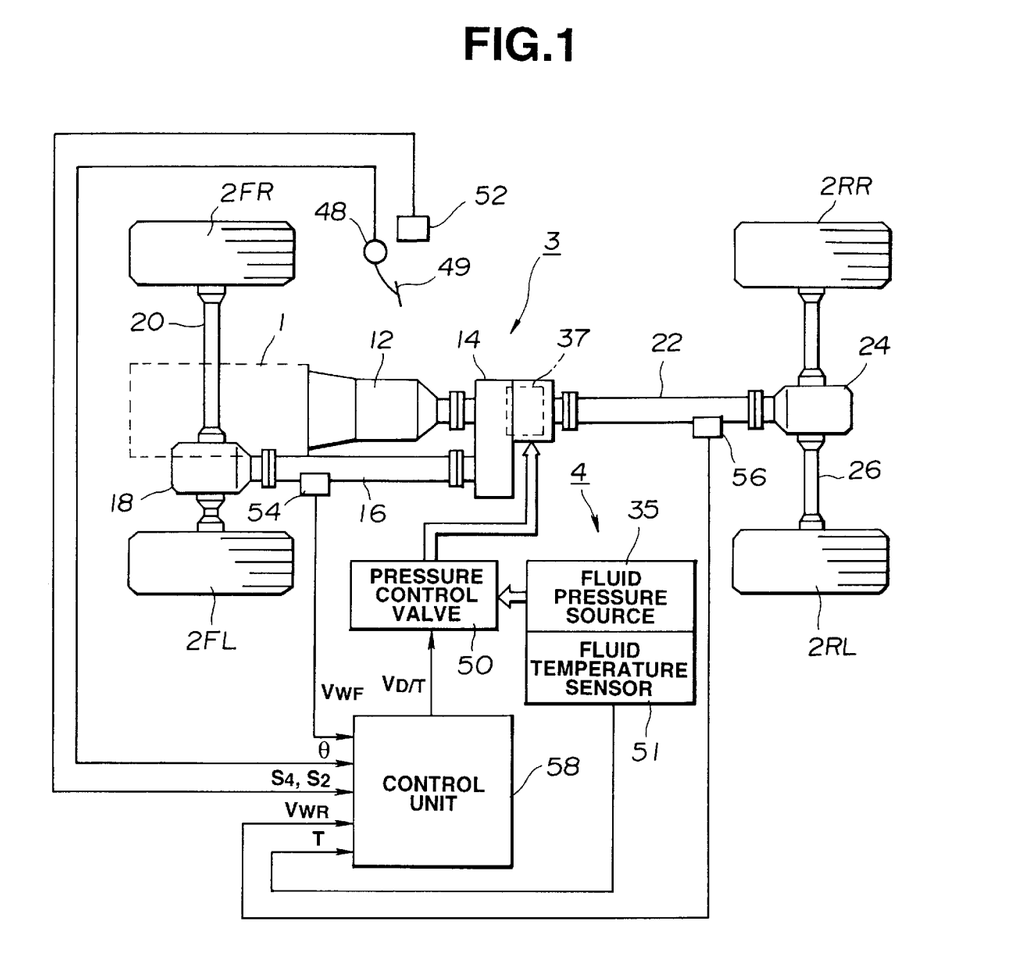
FIG. 1 is a schematic block diagram of a preferred embodiment of a control apparatus for a four-wheel drive vehicle according to the present invention.

FIG. 1 shows a preferred embodiment of a control apparatus for a four-wheel drive vehicle.

The present invention is applicable to a transfer clutch of the four-wheel drive vehicle based on a front engine and rear drive (FR) type.

In FIG. 1, a rotation drive source, i.e, a vehicular engine 1 is mounted in a vehicular engine compartment located at a front portion of the vehicle. Front left and right tire wheels 2FL and 2FR and rear left and right tire wheels 2RL and 2RR are mounted on a front and rear tire wheel drive shafts, respectively.

In addition, a driving transfer system 3 is provided for modifying and controlling a rate of a distribution of a driving force from the engine 1 to the front left and right tire wheels 2FL and 2FR and a driving force distributing control system 4 is provided for controlling over the rate of the distribution carried out by the driving force transfer system 3.

The above-described driving force transfer system 3 includes: a clutch (not shown) arranged for connecting or disconnecting (engaging or disengaging) a driving force generated from the engine 1 to and from a transmission 12, the transmission 12 being arranged for gear shifting an output of the clutch at a selected gear shift ratio; and a transfer 14 arranged for splitting the driving force from the transmission 12 into the front tire wheels 2FL and 2FR (in the embodiment, serve as the auxiliarily driven tire wheels) and the rear tire wheels 2RL and 2RR (in this embodiment, serve as the mainly driven tire wheels). Then, in the driving force transfer system 3, a front tire wheel side driving force split by means of the transfer 14 is distributed (transmitted) to the front tire wheels 2FL and 2FR via a front tire wheel side output shaft 16, a front differential gear 18, and a front tire wheel side drive shaft 20. On the other hand, a rear tire wheel side driving force split by means of the transfer 14 is distributed to the rear tire wheels 2RL and 2RR via a propeller shaft (a rear tire wheel side output shaft) 22, a rear differential gear 24, and the rear tire wheel side drive shaft 26.

Figure 2:
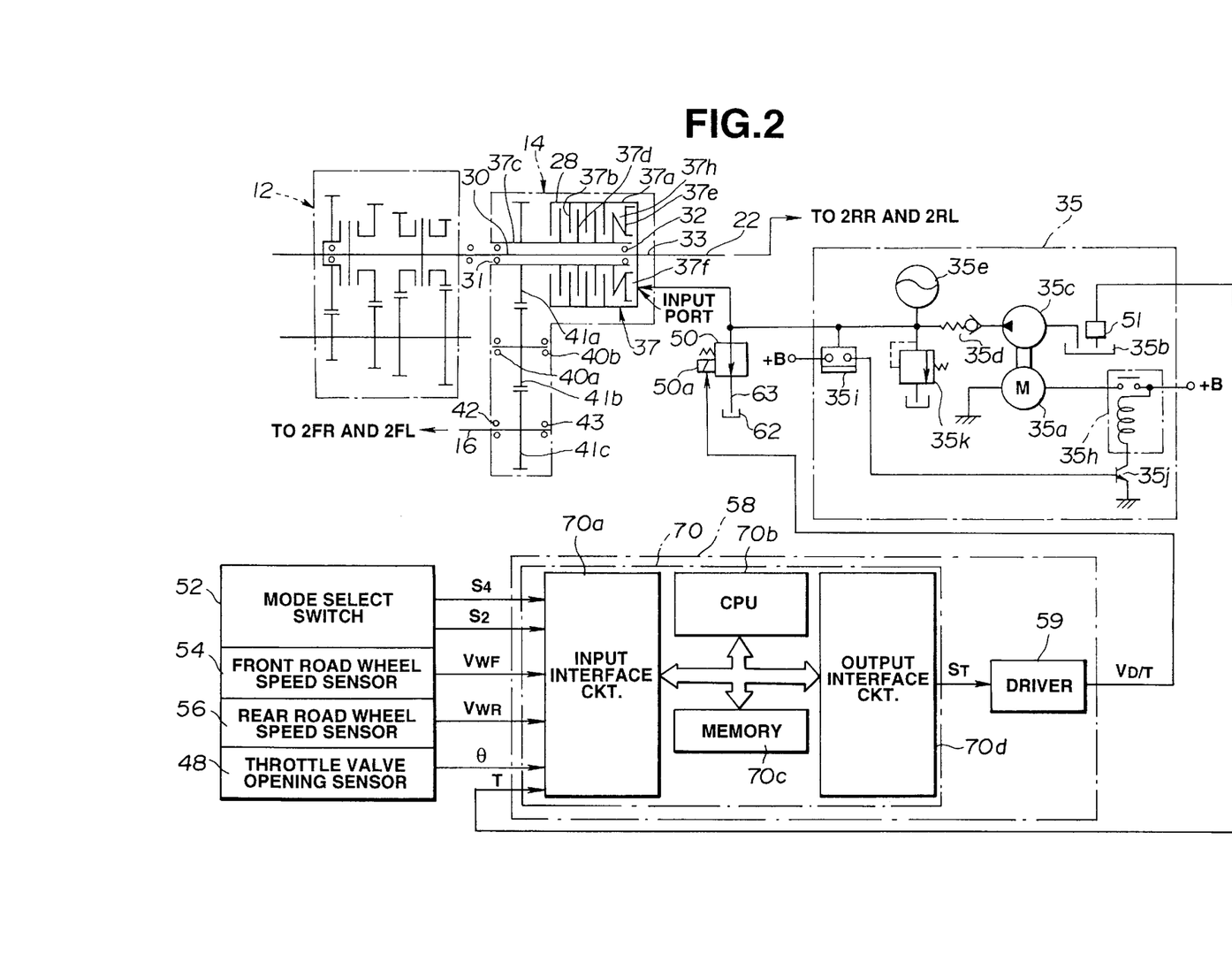
FIG. 2 is a circuit block diagram of a control unit and its peripheral circuit in the control apparatus shown in FIG. 1.

FIG. 2 shows the preferred embodiment of the control apparatus applicable to the four-wheel drive vehicle shown in FIG. 1.

The transfer 14, as shown in FIG. 2, includes an input shaft 30 axially inserted into a transfer casing 28 and whose left end is linked to an output end of the transmission 12, the input shaft 30 being rotatably supported by means of a first bearing 31. A right end of the input shaft 30 as viewed from FIG. 2 is coupled to an output shaft 33 rotatably supported by means of a second bearing 32, the output shaft 33 being linked to the propeller shaft 22. Detailed structures of the transfer 14 and a transfer clutch as will be described later are described in a Japanese Patent Application First Publication No. Heisei 1-204826 or in a U.S. patent application Ser. No. 08/600,254 (the disclosure of which is herein incorporated by reference).

On the other hand, a center portion of the input shaft 30 of the transfer 14 is provided with a fluid-type multi-plate clutch mechanism 37 as a variable torque clutch which can modify a torque distribution ratio between the front and rear tire wheels 2FL to 2RR. The fluid-type multi-plate clutch mechanism 37 includes: a clutch drum 37a in a spline coupling to the input shaft 30; a friction plate 37b engaged in a rotation direction to the clutch drum 37a; a clutch hub 37c rotatably supported to an outer peripheral portion of the input shaft 30 via a needle bearing; a friction disc 37d which is engaged to the clutch hub 37c in the rotation direction; a clutch piston 37e arranged at a right direction of the multi-plate frictional clutch mechanism 37 as viewed from FIG. 2; and a cylinder chamber 37f formed between the clutch piston 37e and the clutch drum 37a. In addition, 37h in FIG. 2 denotes a return spring against a plate of the clutch piston 37e. It is noted that the fluid-type multi-plate clutch mechanism 37 is also linked toward the front tire wheels at its left end side via a gear train of its clutch mechanism 37. In details, the clutch hub 37c is coupled to a first gear 41a in a spline coupling form, the first gear 41a being meshed to a rotatable second gear 41b by means of bearings 40a and 40b, the second gear 41b being linked to the front tire wheel side output shaft 16 via a rotatable third gear 41c.

A predetermined position of a side surface of the transfer casing 28 is formed with an input port to which a working fluid pressure from a pressure control valve 66 constituting a clutch control system as will be described later is supplied as a control force. The working fluid pressure (hydraulic pressure) from the input port is supplied to the cylinder chamber 37f.

Hence, if no supply of the working fluid pressure to the input port is present, i.e., the pressure in the cylinder chamber 37f of the clutch mechanism 37 is equal to or approximately equal to the atmospheric pressure, a spring force of the return spring 37h causes the friction plate 37b and the frictional disc 37d to be spaced apart from each other. In this state, all of an input torque transmitted to the input shaft 30 is transmitted toward the rear tire wheels 2RL and 2RR via the output shaft 33 and the propeller shaft 22 so that the four-wheel drive vehicle is in a two-wheel drive mode in which only the rear tire wheels 2RL and 2RR are driven. On the other hand, in a state where the working fluid is supplied to the input port described above, a pressing force by means of the clutch piston 37e is generated according to the degree of pressure applied to the cylinder chamber 37f and an engaging force (clutching force) due to a frictional force between the friction plate 37b and the friction disc 37d is accordingly developed, thus part of the whole driving force being transmitted to the front tire wheels 2FL and 2FR via the output shaft 16 as well.

A transmission torque $\Delta T$ toward the front tire wheels 2FL and 2FR is increased linearly according to the supplied working fluid pressure P as expressed in the following equation (1):

$$\Delta T = P \cdot S \cdot 2n \cdot \mu \cdot r_m \quad (1)$$

wherein S denotes an area of the clutch piston 37e onto which the pressure is acted upon, n denotes the number of plates of the friction disc 37d, $\mu$ denotes a frictional coefficient of the clutch plate 37d, and $r_m$ denotes a torque transfer effective radius of the friction disc 37d.

In other words, the transmission torque $\Delta T$ toward the front tire wheels 2FL and 2FR is proportional to the supplied working fluid pressure so that the driving torque is distributed and transmitted toward the front and rear tire wheel sides according to the engaging force of the clutch mechanism 37. A distribution ratio (rate) between the front and rear tire wheels 2FL and 2FR and 2RL and 2RR can continuously be modified from 0:100 up to 50:50 according to the pressure P of the working fluid supplied to the input port described above.

Referring back to FIG. 1, the driving force distributing control system 4 includes: the transfer 14, a fluid pressure source 35 having a reservoir 35b within which the working fluid is pressurized by means of the fluid pressure source 35; a pressure control valve 50 arranged for variably controlling the working fluid pressure supplied from the fluid pressure source 35 and supplying the working fluid to the input port of the fluid-type multi-plate clutch mechanism 37; a front tire wheel rotation speed sensor 54 arranged for detecting a rotation speed $V_{WF}$ of one of the front tire wheels 2FL or 2FR; a rear tire wheel rotation speed sensor 56 arranged for detecting a rotation speed $V_{WR}$ of one of the rear tire wheels 2RL or 2RR; a throttle valve opening angle engine throttle valve according to a depression angle of an accelerator pedal 49; a mode select switch 52 arranged for manually switching the driving force distribution to each tire wheel; a fluid temperature sensor 51 arranged for detecting a temperature of the working fluid in the reservoir 35b; and a control unit 58 arranged for controlling the outputted working fluid pressure of the pressure control valve 50 to the input port of the transfer 14 on the basis of the detected signals from these sensors.

The fluid pressure source 35 includes: a DC motor 35a; a pump 35c which boosts the working fluid pressure of the working fluid within the reservoir 35b and supplies the boosted working fluid pressure to the input port of the fluid-type multi-plate clutch mechanism 37; a check valve 35d interposed in a drain side of the pump 35c; an accumulator 35e connected in a tubular passage between the check valve 35d and the input port; and a relief valve 35k connected to a junction of the accumulator 35e. The pressure control valve 50 is interposed in a drain tube 63 branched into the reservoir 62 from the junction of the accumulator 35e and the input port of the clutch mechanism 37.

It is noted that the pressure control valve 50 is constituted by a duty ratio controlled type, normally open pressure reduction valve, and is interposed in the drain tube 63 connected from the drain side of the pump 35c to the tube to the input port.

Figure 3:
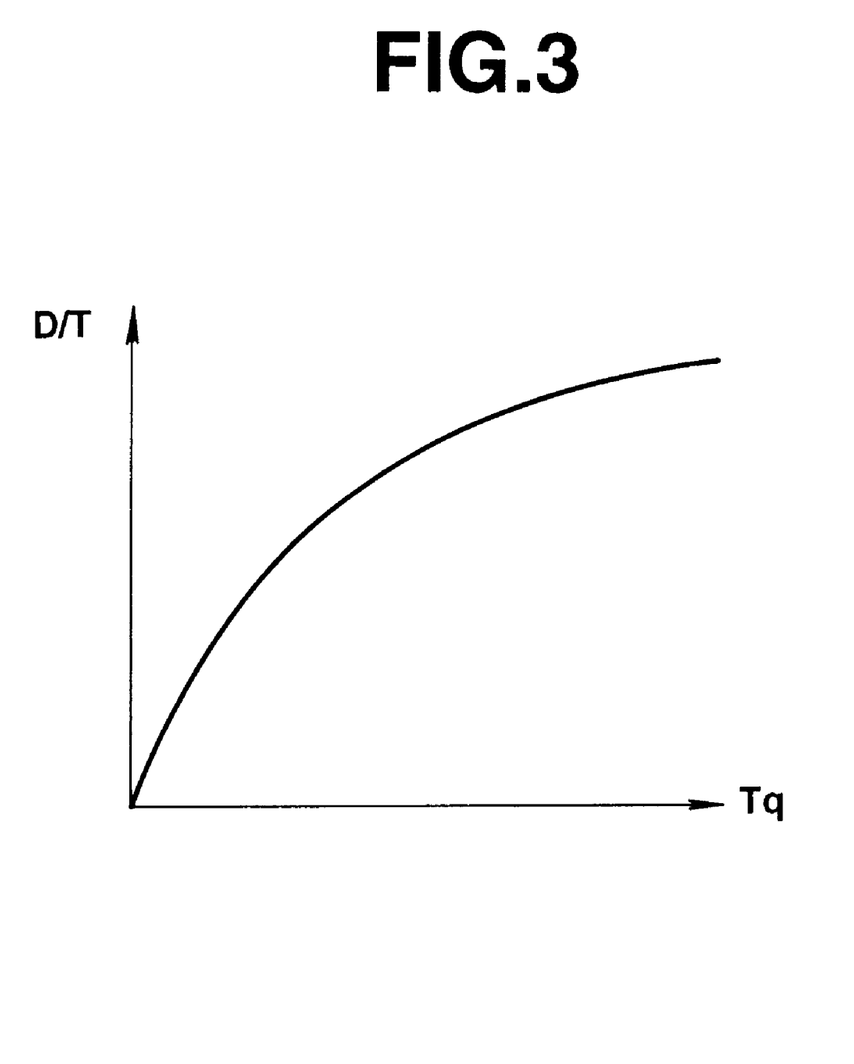
FIG. 3 is a characteristic graph representing a relationship between a pulse duty ratio applied to a pressure control valve shown in FIG. 2 and a target front tire wheel distributing torque calculated in the control unit shown in FIG. 2.

The pressure control valve 50 has a solenoid 50a to which a voltage signal $V_{D/T}$ having the duty ratio controlled according to a PWM control (Pulse Width Modulation Control) is supplied so that an opening angle of a spool disposed within the pressure reduction valve is determined. Thereby, as the duty ratio of the voltage signal $V_{D/T}$ becomes large, a primary side of the pressure reduction valve, namely, the controlled pressure Pc at the clutch mechanism 37, becomes high. It is noted that the controlled pressure Pc at the clutch mechanism side 37 has a linear relationship to the engaging force of the clutch mechanism 37, and the engaging force of the clutch mechanism 37 has a linear relationship to the driving force transmitted to the front tire wheels 2FL and 2FR. Therefore, the distributing torque supplied to the front tire wheels 2FL and 2FR achieved by means of the PWM control (for example, 0 to 115 kgm (115 kgm means a half of the whole driving force) is increased in a quadratic curve form with respect to the duty ratio D/T of the voltage signal $V_{D/T}$, as shown in FIG. 3.

The front tire wheel rotation speed sensor 54 and the rear tire wheel rotation speed sensor 56 are individually disposed at predetermined positions of the output shaft 16 of the front tire wheel side and the propeller shaft 22 at the rear tire wheel side. The rotation speeds of the respective shafts 16 and 22 are detected in optical forms or in electromagnetic forms so that the front and rear tire wheel rotation speeds $V_{WF}$ and $V_{WR}$ in the forms of either pulse signal waveforms or sinusiodal signal waveforms are supplied to a control unit 58, individually.

In addition, the mode switch 52 is, for example, installed on an instrument panel attached in a vicinity to a driver's seat. When, for example, the driver selects a two-wheel drive mode from the mode select switch 52 in order to desire the two-wheel drive mode, in which the driving force is transmitted to the mainly driven tire wheels, i.e., the rear left and right tire wheels 2RL and 2RR only, a two-wheel drive mode select signal $S_2$ indicating an ON state of a logical value of 1 is outputted to the control unit 58. When the driver selects a four-wheel automatic running mode from the mode select switch 52 in order to desire the four-wheel drive automatic driving (running) mode, in which the rate of the distribution of the driving force to the front and rear tire wheels is automatically controlled between 0:100 and 50:50 according to a running condition of the vehicle or according to the driver operation input state, a four-wheel drive mode select signal $S_4$ indicating the ON state of the logical value of 1 is outputted to the control unit 58. It is noted that when the mode select signal having the logical value of 1 is outputted, the other mode select signal having the logical value of 0 is outputted to the control unit 58.

The throttle valve opening angle sensor 48 is constituted by a potentiometer associated with the accelerator pedal 49 in order to detect the opening angle of the engine throttle valve. Specifically, when no accelerator depression is present, the opening angle of the throttle valve is assumed to 0%. When the driver depresses the accelerator pedal 49 fully up to a limit, the opening angle of the throttle valve is assumed to 100%. The opening angle of θ which is constituted by the voltage output according to the depression rate of the accelerator pedal 49 between 0% and 100% is supplied to the control unit.

The control unit 58 includes a microcomputer 70 and the pressure control valve 50. The microcomputer 70 includes: an Input interface circuit 70a having an analog-to-digital conversion function to read each detected value thereinto from the detected signals of each sensor and switch; a CPU (Central Processing Unit) 70b; a Memory 70c having a RAM (Random Access Memory) and ROM (Read Only Memory); and an Output interface circuit 70d having a digital-to-analog conversion function in order to output a control signal $S_T$ concerning the engaging force of the clutch mechanism 37 derived from the CPU 70b.

Figure 4:
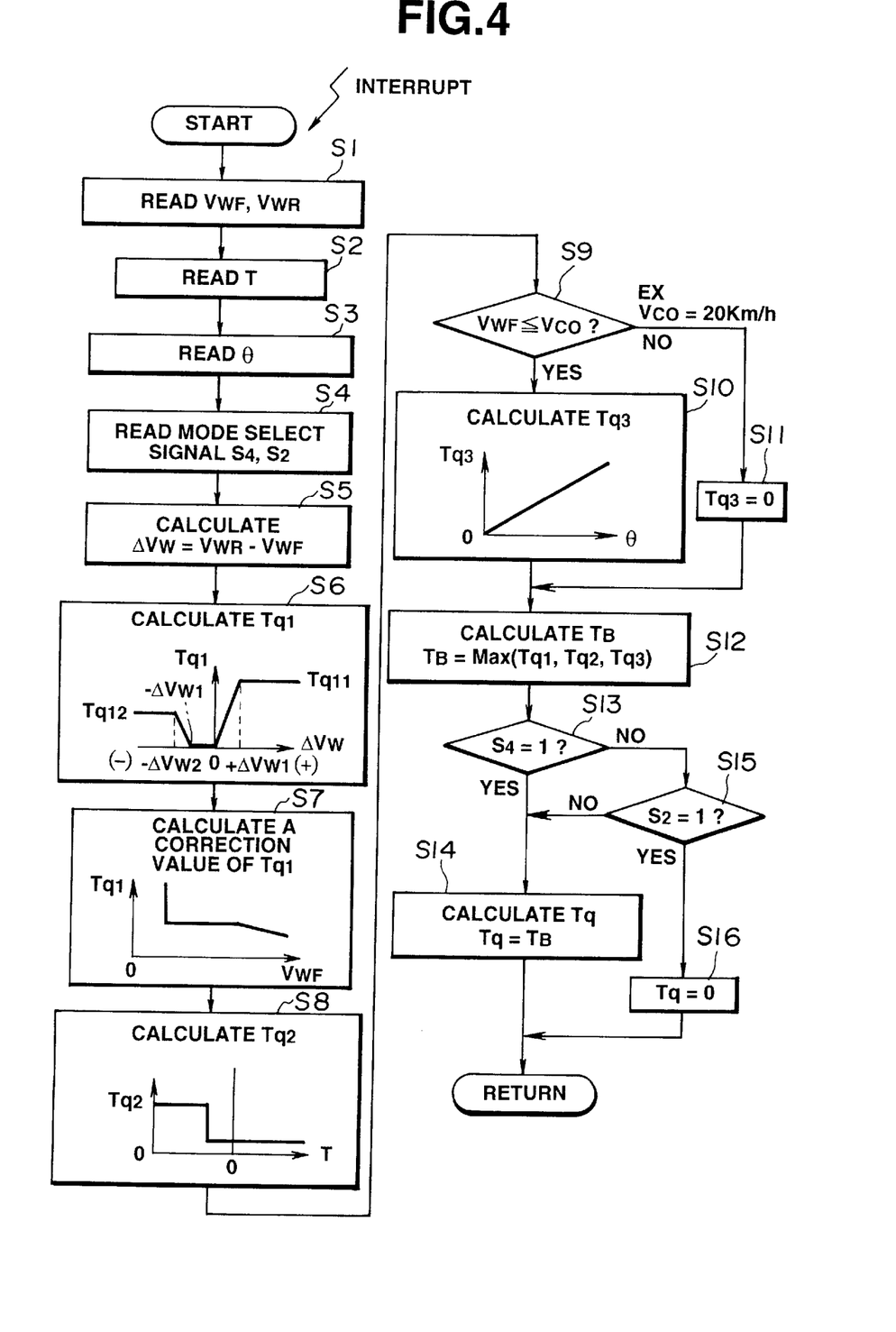
FIG. 4 is an operational flowchart for explaining an arithmetic operation to derive the target front tire wheel distributing torque in the control unit shown in FIG. 2.

The microcomputer 70 of the control unit 58 derives a first front tire wheel distributing torque $T_{q1}$ from a difference $\Delta V_W$ between the front and the rear tire wheel rotation speeds $V_{WF}$ and $V_{WR}$, derives a second front tire wheel distributing torque $T_{q2}$ from the fluid temperature T, derives a third front tire wheel distributing torque $T_{q3}$ according to the opening angle θ of the engine throttle valve, derives a reference front tire wheel distributing torque $T_B$ from a maximum value among these front tire distributing torque values ($T_{q1}$, $T_{q2}$, and $T_{q3}$), sets a target front tire wheel distributing torque $T_q$ according to the mode select switch select signal $S_4$ or $S_2$ and the maximum value derived above, and outputs the target front tire wheel distributing torque $T_q$ in the form of the control signal $S_T$ to a driver 59, as shown in FIG. 4.

The driver 59 sets the duty ratio (D/T) of the solenoid 50a of the pressure control valve 50 according to a characteristic graph of FIG. 3 so as to achieve the target front tire wheel distributing torque $T_q$ in the form of the control signal $S_T$ outputted from the microcomputer 70. The driver 59 includes a PWM drive circuit having, for example, a reference wave signal generator and a comparator in order to output a command voltage signal $V_{D/T}$ as a drive signal having the duty ratio D/T described above.

Next, FIG. 4 shows an operational flowchart executed by the control unit 58 in the embodiment shown in FIGS. 1 and 2.

The routine shown in FIG. 4 is executed as a timer interrupt processing executed whenever a predetermined sampling time ΔT (for example, 10 msec.) is passed.

Maps, equations, and program required for arithmetically processing are read from the ROM of the memory 70c and intermediate results of calculations and information values are stored in the RAM of the memory 70c.

At a first step S1, the CPU 70b reads the front tire wheel rotation speed $V_{WF}$ and the rear tire wheel rotation speed $V_{WR}$ from the front and rear tire wheel rotation speed sensors 54 and 56, respectively.

At a second step $S_2$ , the CPU 70b reads the fluid temperature T from the fluid temperature sensor 51.

At a third step $S_2$ , the CPU 70b reads the opening angle θ of the throttle valve opening angle sensor 48.

At a fourth step S4, the CPU 70b reads the logical values of the mode select switch signals $S_4$ and $S_2$.

Next, the routine goes to a step S5, in which the CPU 70b calculates a difference in the rotation speed between the front and rear tire wheel rotation speeds $V_{WF}$ and $V_{WR}$ in accordance with the following equation (2).

$$\Delta V_W = V_{WR} - V_{WF} \quad (2)$$

Figure 5:
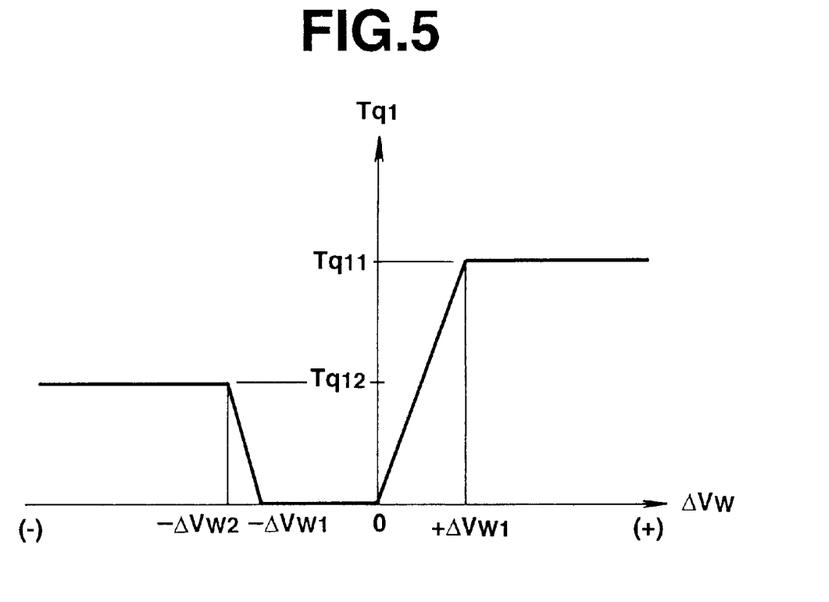
FIG. 5 is a control map for calculating and setting a first front tire wheel distributing torque ($T_{q1}$) stored in a memory of the control unit shown in FIG. 2.

Next, at a step S6, the CPU 70b looks up a control map table shown in FIG. 5 to derive the first front tire wheel distributing torque $T_{q1}$ using the difference $\Delta V_W$ calculated at the step S5. In the control map shown in FIG. 5, the first front tire wheel distributing torque $T_{q1}$ is maintained at a relatively large predetermined value $T_{q11}$ (for example, about 115 kgm, specifically, a maximum rate of the distribution between the front and rear tire wheels indicating 50:50) in a region in which the difference $\Delta V_W$ is positive and is in excess of a (positive) first predetermined threshold ($+\Delta V_{W1}$) In a region from zero to, the positive threshold ($+\Delta V_{W1}$) the first front tire wheel distributing torque $T_{q1}$ is linearly increased along with the increase in the difference $\Delta V_W$. On the other hand, in a case where the difference ($\Delta V_W$) is negative, a dead zone indicating zero of the first front tire wheel distributing torque $T_{q1}$ is set in a region from the difference $\Delta V_W$ indicating zero to that indicating a negative first predetermined threshold ($-\Delta V_{W1}$) Furthermore, if the difference $\Delta V_W$ is negative and negatively larger than a second predetermined threshold ($-\Delta V_{W2}$) whose absolute value is larger than the first predetermined threshold ($+\Delta V_{W1}$), the first front tire wheel distributing torque $T_q$ is maintained at a relatively small predetermined value $T_{q12}$ (for example, approximately 50 kgm). The first front tire wheel distributing torque $T_{q1}$ is linearly increased along with the decrease in the difference $\Delta V_W$ in a region from the second predetermined threshold ($-\Delta V_{W2}$) up to zero.

Figure 6:
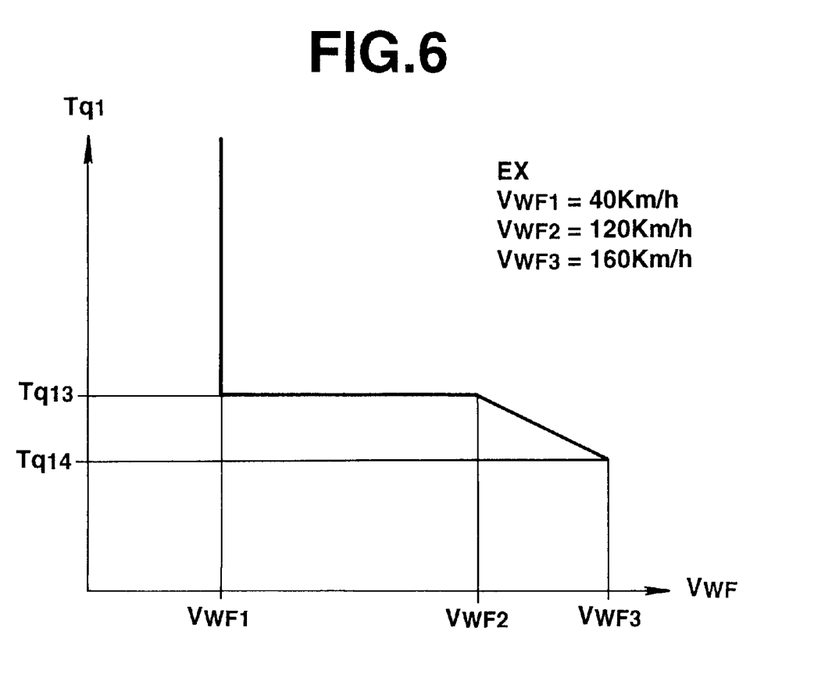
FIG. 6 is another control map for calculating and correcting the first front tire wheel distributing torque stored in the memory of the control unit shown in FIG. 2.

Next, at a step S7, the CPU 70b looks up a control map table of FIG. 6 to modify the first front tire wheel distributing torque $T_{q1}$ from the control map shown in FIG. 6 using the front tire wheel rotation speed (auxiliarily driven tire wheel rotation speed) $V_{WF}$ read at the step S1, since the front tire wheel rotation speed $V_{WF}$ can be assumed to be equal or approximately equivalent to a vehicle body speed. In the control map shown in FIG. 6, the first front tire wheel distributing torque $T_{q1}$ is corrected to be maintained constantly at a relatively low predetermined value $T_{q13}$ (for example, 20 kgm) when the front tire wheel rotation speed $V_{WF}$ falls in a speed range from a first predetermined threshold value $V_{WF1}$ (first reference speed: for example, approximately 40 km/h) to a second predetermined threshold value $V_{WF2}$ (for example, approximately 120 km/h). Then, the first front tire wheel distributing torque $T_{q1}$ is corrected so as to be linearly decreased to a further lower predetermined value $T_{q14}$ (for example, approximately 15 kgm) which is lower than the relatively low predetermined value $T_{q13}$ when the front tire wheel rotation speed $V_{WF}$ falls in a speed range from the second predetermined threshold value $V_{WF2}$ up to a third predetermined threshold value $V_{WF3}$ (for example, approximately 160 km/h). It is noted that in a speed range lower than the first predetermined threshold value $V_{WF1}$, the correction value of the first front tire wheel distributing torque $T_{q1}$ is not set according to the control map shown in FIG. 6, in this speed range, the value set in the control map of FIG. 5 is determined to be the first front tire wheel distributing torque $T_{q1}$ and the routine goes to a step S8.

Figure 7:
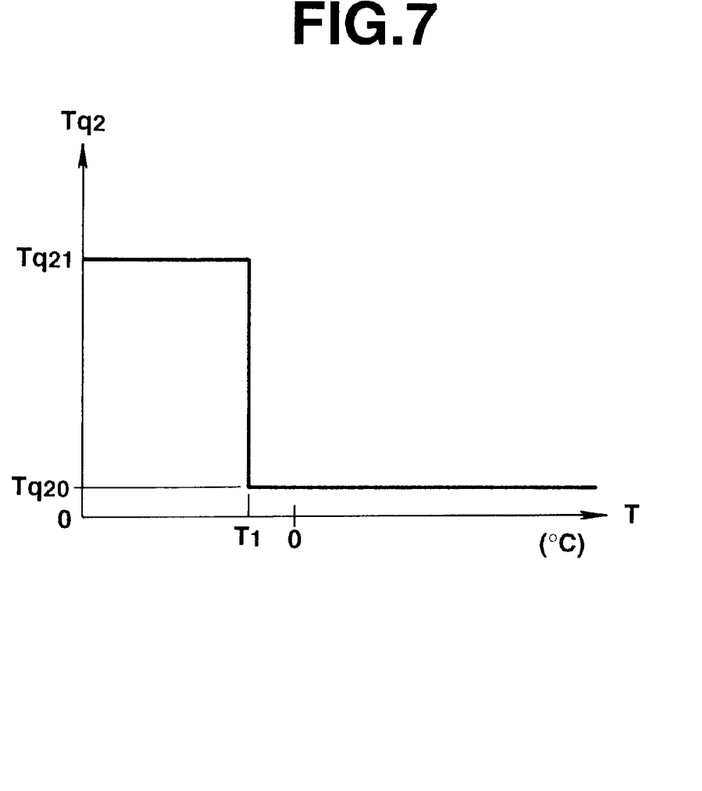
FIG. 7 is another control map for calculating and setting a second front tire wheel distributing torque ($T_{q2}$) stored in the memory of the control unit shown in FIG. 2.

At the step S8, the CPU 70b calculates and sets the second front tire wheel distributing torque $T_{q2}$ from a control map shown in FIG. 7 using the read fluid temperature T at the step $S_2$.

In the control map shown in FIG. 7, if the fluid temperature T falls in a normally operating temperature range equal to or above a predetermined threshold value $T_1$ (for example, −1° C.) which is lower than 0° C., the second front tire wheel distributing torque $T_{q2}$ is maintained at a small predetermined value $T_{q20}$ (for example, 2 to 4 kgm). If the fluid temperature T falls in a cold weather operating temperature range which is lower than the predetermined threshold value $T_1$, the second front tire wheel distributing torque $T_{q2}$ is maintained at a large predetermined value (for example, about 60 kgm).

Next, the routine goes to a step S9 in which the CPU 70b determines whether the front tire wheel rotation speed (auxiliarily driven tire wheel rotation speed) $V_{WF}$ is equal to or below a predetermined vehicle body speed Vco (for example, approximately 20 km/h). If YES at the step S9 the routine goes to a step S10. If NO at the step S9, the routine goes to a step S11.

Figure 8:
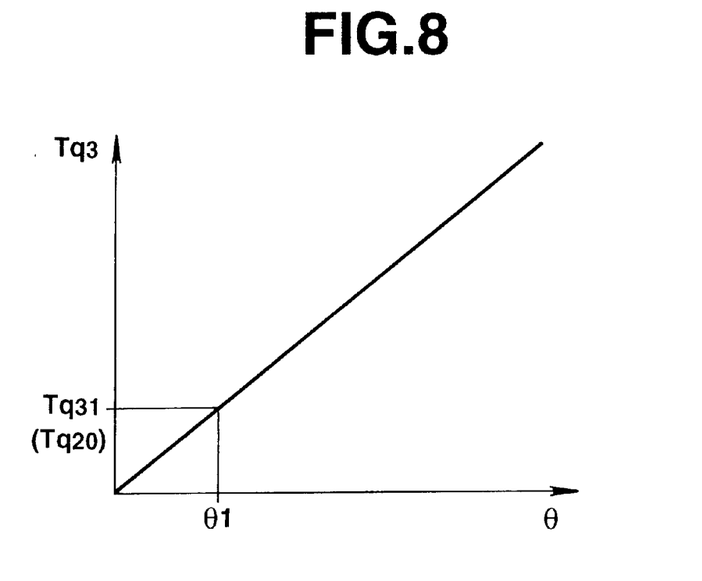
FIG. 8 is another control map for calculating and setting a third front tire wheel distributing torque ($T_{q3}$) stored in the memory of the control unit shown in FIG. 2.

At the step S10, the CPU 70b calculates and sets the third front tire wheel distributing torque $T_{q3}$ from a control map shown in FIG. 8 using the read opening angle of the engine throttle valve at the step S3, and the routine goes to a step S12. In the control map shown in FIG. 8, the third front tire wheel distributing torque $T_{q3}$ is inversely proportional to the opening angle θ of the throttle valve.

It is noted that the third front tire wheel distributing torque $T_{q31}$ corresponding to the opening angle $θ_1$ immediately after the depression by the driver on the accelerator pedal 49 is set so as to be larger than the small predetermined value $T_{q20}$ of the second front tire wheel distributing torque $T_{q2}$ in the control map shown in FIG. 7.

On the other hand, at the step S11, the third front tire wheel distributing torque $T_{q3}$ is set to zero and, thereafter, the routine goes to the step S12.

At the step S12, a maximum value from among the first front tire wheel distributing torque $T_{q1}$ set at the step S6 or modified at the step S7, the second front tire wheel distributing torque $T_{Q2}$ set at the step S8, and the third front tire wheel distributing torque $T_{q3}$ set at the step S10 or step S11 is selected as a reference front tire wheel distributing torque $T_B$ in accordance with the following equation (3).

$$T_B = \text{MAX}(T_{q1}, T_{q2}, T_{q3}). \tag{3}$$

In the equation (3), MAX denotes the selection of the maximum value from any one of the three values.

Next, the routine goes to a step S13 in which the CPU 70b determines whether the four-wheel automatic running mode select signal S4 described above indicates the logical value of 1. If the logical value of the mode select signal $S_4$ indicates 1 (YES) at the step S13, the routine goes to a step S14. If NO the logical value thereof indicates 0 (NO) at the step S13, the routine goes to a step S15.

At the step S15, the CPU 70b determines whether the logical value of the other two-wheel drive mode select signal $S_2$ is 1. If 1 (YES) at the step S15, the routine goes to a step S16. If 0 (NO) at the step S15, the routine goes to the step S14.

At the step S14, the CPU 70b sets the reference front tire wheel distributing torque $T_B$ calculated at the step S12 to the target front tire wheel distributing torque $T_q$ and updates and stores the target front tire wheel distributing torque $T_q$ into the memory 70c and returns to a main program routine (not shown).

On the other hand, at the step S16, the value of zero is set as the target front tire wheel distributing torque $T_q$ and updates and stores the zeroed target front tire wheel distributing torque $T_q$ into the memory 70c, and the routine returns to the main program routine.

Next, an operation of the control apparatus for the four-wheel drive vehicle in the preferred embodiment described above will be described in details.

The four-wheel drive vehicle to which the control apparatus according to the present invention is applicable is provided with an independent fluid pressure control system, and a line pressure in the fluid pressure control system shown in FIG. 2 is constant or automatically adjusted at a substantially constant value. The clutch engaging force adjustment by means of the duty ratio control for the pressure control valve 50 and the adjustment of the driving force distribution to the front tire wheels 2FL and 2FR have been described before.

First, suppose that the four-wheel drive vehicle is running normally (in a state where the tire wheels having the same tire radii are mounted on the front and rear tire wheel positions), and difference in the front and rear tire wheel rotation speeds $V_{WF}$ and $V_{WR}$ read at the step S1 of FIG. 4 is developed ($ΔV_W$)

At this time, the first front tire wheel distributing torque $T_{q1}$ at the step S6 of FIG. 4 is set. The control map used to derive the first front tire wheel distributing torque is shown in FIG. 5. The variable of FIG. 5 is the difference in the rotation speed between the front and rear tire wheel rotation speeds, i.e., $ΔV_W$, and is the subtraction result of the auxiliarily driven tire wheel rotation speed (namely, the front tire wheel rotation speed $V_{WF}$) from the mainly driven rotation speed (namely, the rear tire wheel rotation speed $V_{WR}$) in accordance with the equation (2). Thus, if the difference $ΔV_W$ is positive, the rear tire wheels 2RL and 2RR are in excess of the vehicle body speed are rotated with slippage due to a lowered frictional coefficient (low $μ$) road surface on which the vehicle is running or due to an abrupt acceleration of the vehicle. Then, the positive difference means a degree of slippage, and, as the positive difference $ΔV_W$ becomes large, the driving force applied to the front tire wheels 2FL and 2FR (i.e., the auxiliarily driven tire wheels) needs to be increased so as to increase a vehicular running stability including an understeer tendency. As shown in the control map of FIG. 5, the first front tire wheel distributing torque $T_{q1}$ is rapidly increased together with the increase in the rotation speed difference $ΔV_W$ when the difference $ΔV_W$ is positive and falls in the range between zero difference and the positive first predetermined threshold (+$ΔV_{W1}$). When the rotation speed difference $ΔV_W$ is positive and in excess of the first predetermined threshold (+$ΔV_{W1}$) for example, the rate of the distribution of the driving force between the front and rear tire wheels is 50:50 that the vehicle can be in, so-called a four-wheel drive direct coupled state. Thus the vehicular running stability is increased at its maximum limit.

When the vehicle is running normally, and the rotation speed difference $ΔV_W$ is negative, either (1) tire lock tendency may occur or (2) tight corner braking phenomenon may occur. In tire lock tendency, the mainly driven tire wheels (in the embodiment, the rear left and right tire wheels 2RL and 2RR) are rotated in excess of the vehicle body speed (in actuality, a rear tire wheel braking force due to a wheel cylinder force is, in many cases, adjusted so as to provide the lock tendency at the approximately same time as the front tire wheels by means of a proportional valve). In tight corner braking phenomenon, the front tire wheels which have a larger cornering radii than the rear tire wheels are rotated faster than the rear tire wheels, which have a smaller cornering radii, while the vehicle is cornering at a cornering radius below some degree of cornering radius on a high $μ$ (higher frictional coefficient road surface).

At this time, in the control map shown in FIG. 5, the dead zone is set in the speed difference range from zero to the negative first predetermined threshold ($-ΔV_{W1}$), and, when the difference falls in the dead zone, the first front tire wheel distributing torque $T_{q1}$ is set to zero so that the amplification of the tire lock tendency and a tight corner braking phenomenon can be avoided. When the speed difference $\Delta V_W$ falls in the speed range from the negative first predetermined threshold $(-\Delta V_{W1})$ to the negative second predetermined threshold $(-\Delta V_{W2})$, the first front tire wheel distributing torque $T_{q1}$ is rapidly increased together with the decrease in the speed difference $\Delta V_W$. When the speed difference $\Delta V_W$ falls in the speed difference range negatively exceeding the second predetermined threshold $(-\Delta V_{W2})$, the rate of the distribution of the driving force to the front tire wheels is increased to some degree, specifically, for example, about ¼ the rate of the distribution to the rear tire wheels so as to appropriately increase the vehicular running stability including the understeer tendency.

Suppose that the four-wheel drive vehicle to which the present invention is applicable is running with the front or rear tire wheels having different tire radii from the standard tire wheels mounted on either of the front or rear tire wheel drive shaft.

In this case, since the first front tire wheel distributing torque $T_{q1}$ is increased and set along with an increase in the rotation speed difference $\Delta V_W$ calculated at the step S6 of FIG. 4, control hunting will occur in the control of the rate of the distribution of the driving force to the front tire wheels 2FL and 2FR.

Therefore, in the flowchart executed with reference to FIG. 4, the corrective setting of the first front tire wheel distributing torque $T_{q1}$ is carried out at the step S7 on the basis of the front tire wheel rotation speed $V_{WF}$ read at the step S.

Usually, in four-wheel drive vehicles in which the tire wheels having different radii from the originally mounted tire wheels are mounted as either of the front or rear tire wheels, the control hunting occurs easily since the rotation speed difference between the front and rear tire wheels $\Delta V_W$ is significantly increased in either positive or negative direction when the vehicle speed is transferred to a normal speed run exceeding (or equal to) 40 km/h. To cope with the possible control hunting, in the control map used in the step S7 and shown in FIG. 6, the first front tire wheel distributing torque $T_{q1}$ is corrected to be set to the predetermined low value of $T_{q13}$ when the front tire wheel rotation speed is increased and exceeds the first predetermined threshold $V_{WF1}$ set to, for example, 40 km/h. In addition, when the front tire wheel rotation speed $V_{WF}$ is furthermore increased and exceeds 120 km/h, the first front tire wheel distributing torque $T_{q1}$ is corrected to be set to the further low predetermined value $T_{q14}$.

Hence, even if the rotation difference $\Delta V_W$ is significantly increased due to the irregular mount of the tire wheels having the different radii as either or both of the front and rear tire wheels, the front tire wheel distributing torque $T_{q1}$ is maintained constant at the predetermined low value $T_{q13}$ so that the control hunting can be avoided. In this state, since a constant engaging force is maintained between the friction plates 37b and the friction disc of the fluid-type multi-plate clutch mechanism 37, no vibration occurs.

It is noted that the control map shown in FIG. 6 serves to correct the first front tire wheel distributing torque $T_{q1}$ to the low value when the front tire wheel rotation speed $V_{WF}$ is, for example, in excess of the first predetermined threshold $V_{WF1}$ set to, for example, 40 km/h. If the rotation speed difference $\Delta V_W$ is increased with the rear tire wheels 2RL and 2RR (mainly driven tire wheels) being slipped and being in excess of the vehicle body speed (front tire wheel rotation speed $V_{WF}$) due to the vehicle start to run on the low friction coefficient road surface, the front tire wheel rotation speed $V_{WF}$ is generally at a low speed below 40 km/h and, thus, the front tire wheel distributing torque $T_{q1}$ is rapidly increased according to the control map shown in FIG. 5. Consequently, a performance of the vehicle when the vehicle starts to run can be increased at its maximum limit.

Next, in FIG. 4, the second front tire wheel distributing torque $T_{q2}$ is set at the step S8 from the fluid temperature T in the reservoir 35b read at the step S8 and detected by the fluid temperature sensor 51. The working fluid used in the normal fluid pressure control system has its viscosity too large under an extremely low temperature below a melting point of ice of 0° C. so that a dynamic characteristic of an actuator of the fluid pressure control system becomes varied. In the embodiment, under such an extremely low temperature operating environment as described above, the predetermined working fluid pressure is not supplied to the fluid-type multi-plate clutch mechanism 37 with respect to the duty ratio to the pressure control valve 50 and, thereby, the rate of the distribution of the driving force between the front and rear tire wheels does not coincide with the target value, and the erroneous operation results. In addition, there is a high possibility of snow fall and snow accumulation on the road surface on which the vehicle is to run under the extremely low temperature working environment below the melting point of ice of 0° C. Hence, according to the control map of FIG. 7, when the working fluid temperature T falls in a temperature range below the predetermined threshold T, set below the melting point of ice 0° C., the second front tire wheel distributing torque $T_{q2}$ is increased to the large predetermined value $T_{q21}$ corresponding to the four-wheel direct coupled state such that the rate of the distribution of the driving force between the front and the rear tire wheels is 50:50. Consequently, the erroneous operation of the fluid pressure control system can be prevented, and the splitting of the driving force to the four tire wheels can be achieved to increase the running stability of the vehicle, including the understeer stability. It is noted that the second front tire wheel distributing torque $T_{q2}$ set under such an extremely low working temperature as described above may be determined appropriately according to the temperature characteristics of the working fluid and the fluid pressure control system, and the second front tire wheel distributing torque $T_{q2}$ may be set in a stepwise manner to the constant value of $T_{q21}$ when the fluid temperature T is below the predetermined low value $T_1$ or alternatively, may be set continuously according to the temperature characteristics thereof.

On the other hand, when the control of the driving force distribution under the normal temperature working environment, except the extremely low temperature working condition, is carried out, and the duty ratio of the voltage signal to the pressure control valve 50 gives 0% in order to transmit the driving force only to, for example, the rear tire wheels (mainly driven wheels), the friction plates 37b and the friction discs 37d of the clutch mechanism 37 are completely spaced from each other since the driving force distribution adjusting means is constituted by the clutch mechanism in the embodiment. In this state, for example, when the friction plates 37b and the friction discs 37d begin to contact each other, so that the engaging force is in excess of zero, and thereafter the command signal to further increase the engaging force of both plates and discs is outputted, discontinued points occur in the aging change of the driving force distributed to the front tire wheels 2FL and 2FR. In addition, a response delay occurs in the driving force distribution control to the front tire wheels due to a response time until the clutch mechanism 37 starts to contact both of the plates and discs of the clutch mechanism 37. Furthermore, an impulse may occur due to the engagement of the clutch mechanism in a very short period of time.

Therefore, according to the control map of FIG. 6, when the working fluid temperature T falls in a range equal to or above the predetermined threshold $T_1$, the second front tire wheel distributing torque $T_{q2}$ is set to the small predetermined value $T_{q20}$ such that the clutch mechanism 37 only lightly contacts both of the plates and discs so that the driving force distributed to the front tire wheels is not developed thereat. Hence, such a response delay and an impulse occurrence as described above can be avoided.

Next, in the flowchart of FIG. 4, the third front tire wheel distributing torque $T_{q3}$ is calculated and set at the step S9 or S10 according to the opening angle $\theta$ of the throttle valve read at the step S3. As described in the setting of the first front tire wheel distributing torque $T_{q1}$, almost all of the driving force distribution control between the front and rear tire wheels are the feedback control according to the actually developed rotation speed difference $\Delta V_W$.

During a time duration from a time at which the engaging force of the clutch mechanism 37 is varied to a time at which the driving force is distributed at the auxiliarily driven tire wheels, i.e., the front tire wheels 2FL and 2FR, a response delay occurs up to a time at which the engine output is transmitted to the front tire wheels 2FL and 2FR against rotation inertia of the front tire wheel driving system (specifically, the front tire wheel side output shaft 16, the front differential gear 18, the front tire wheel side drive shaft 20, and the front tire wheels themselves 2FL and 2FR) and at which the tires of the front wheels 2FL and 2FR kick the running road surface to rotate. Hence, in the feedback system according to the rotation speed difference $\Delta V_W$, when slippage of the rear tire wheels 2RL and 2RR occurs most easily, i.e., when the vehicle starts to run on the low frictional coefficient ($\mu$) road surface, the response delay the becomes large so that a convergence of the slippage becomes worsened.

Hence, in the flowchart of FIG. 4, the CPU 70b determines that the vehicle starts to run when the front tire wheel rotation speed $V_{WF}$, which is equivalent or approximately equivalent to the vehicle body speed, falls in the speed range below the predetermined vehicle body speed Vco at the step S9, and the routine goes to the step S10. Then, the CPU 70b deems that the slippage (a magnitude of slips) which would be developed on the rear tire wheels 2RL and 2RR, the engine output, and the engine throttle valve opening angle $\theta$ have mutually linear relationships to one another and reads the opening angle $\theta$ of the throttle valve, which is earliest in terms of a time series from among the above-described variables. Then, in the control map of FIG. 8 used in the step S10 of FIG. 4, the third front tire wheel distributing torque $T_{q3}$ is increased in proportion to the increase in the opening angle $\theta$ of the throttle valve to provide a feedforward control component, and significantly increasing and decreasing is set having the feedforward control component. When the third front tire wheel distributing torque $T_{q3}$ is set as the final target front tire wheel distributing torque $T_B$, excessive slips on the rear tire wheels 2RL and 2RR during the vehicle start can be avoided, or the convergence characteristic after the occurrence of the excessive slips can be increased.

In the preferred embodiment, when the front tire wheel rotation speed $V_{WF}$ falls in a range exceeding the predetermined vehicle body speed Vco, the CPU 70b determines that it is not the time for the vehicle to start to run at the step S9, and the routine goes to the step S11 in which the CPU 70b sets the third front tire wheel distributing torque $T_{q3}$ to 0, and the feedforward control during the vehicle start to run is forcefully ended.

Next, at the step S12 of FIG. 4, the maximum value from the first, second, and third front tire wheel distributing torques $T_{q1}$, $T_{q2}$, and $T_{q3}$ is elected as the reference front tire wheel distributing torque $T_B$, which is the reference value of the final target front tire wheel distributing torque $T_q$.

This is because each of the three first, second, and third front tire wheel distributing torques $T_{q1}$, $T_{q2}$, and $T_{q3}$, determined as described above, is independently set according to a running condition of the vehicle and operation input of the vehicle driver and the objects of the settings of the first, second, and third front tire wheel distributing torques are common and to increase the running stability. Therefore, with no consideration of which front tire wheel distributing torque has the highest priority, or of which rate of the first, second, and third front tire wheel distributing torques is to be increased taken, the maximum value of any one of the first, second, and third front tire wheel distributing torques is selected as the reference front tire wheel distributing torque $T_B$.

Next, at the steps of S13 to S16 in the flowchart of FIG. 4, the target front tire wheel distributing torque $T_q$ is calculated and outputted according to the logical values of the mode select signals of $S_2$ and $S_4$.

That is to say, the respective front tire wheel distributing torques $T_{q1}$ to $T_{q3}$, set as described above, need to be executed when the driver intentionally selects the four-wheel automatic running mode expecting the most appropriate four-wheel driven state according to the vehicular running condition and/or the operation input by the driver. When the two-wheel driven state is selected, the control apparatus needs to be in the running state naturally respecting the intention of the driver.

Hence, when the four-wheel automatic running mode is selected according to the logical value of the mode select signal $S_4$, the routine goes from the step S13 to the step S14 so that the reference front tire wheel distributing torque value $T_B$ is directly calculated and outputted as the target front tire wheel distributing torque $T_q$. When the two-wheel running mode is selected according to the logical value of the mode select signal $S_2$, the routine goes from the step S13 to the steps S15 and S16 in which the target front tire wheel distributing torque $T_q$ is calculated and outputted as 0.

Hence, in the embodiment, when the four-wheel drive vehicle is running at the normal running speed exceeding approximately 40 km/h, with the tire wheels having different radii from the originally equipped tire wheels mounted as either of the front or rear tire wheels, the rotation speed difference between the front and rear tire wheels $\Delta V_W$ becomes increased due to the mounting of the tire wheels having the different radii, even if no slip on the rear tire wheels 2RL and 2RR running on the low frictional coefficient road surface occurs. Hence, although the feedback control of the rate of the distribution of the driving force between the front and rear tire wheels is executed so that the first front tire wheel distributing torque $T_{q1}$ is increased along with the increase in the rotation speed difference $\Delta V_W$, and the control hunting such that the engaging force of the clutch mechanism 37 is remarkably increased and decreased is repeated, the first front tire wheel distributing torque $T_{q1}$ is corrected and set to the predetermined low value $T_{q13}$ or $T_{q14}$ at the step S7 so that the the clutch mechanism 37 is maintained constantly at its minimum engaging force limit, even if the rotation speed difference $\Delta V_W$ is increased. Hence, as shown in a solid line of FIG. 9, the distributed driving force to the front tire wheels (which are the auxiliarily driven tire wheels) can be maintained constant so that the control hunting in the driving force distribution can prevented. In addition, since the risk of the engaging force of the frictional clutch significantly increasing and decreasing eliminated, vibration thereat is not developed.

It is noted that, in the embodiment, the driving force distribution control is set such that the clutch mechanism 37 is maintained in the constant minimum engaging force indicating state only when the vehicle (1) has tire wheels of different radii from the originally equipped tire wheels, and (2) mounted as the front or rear tire wheels is running at the normal running speed (equal to or above 40 km/h). Hence, in a case where the rear tire wheels (mainly driven tire wheels) slip and the rotation speed difference $\Delta V_W$ is increased, the feedback control of the rate of the distribution of the driving force between the front and rear tire wheels is executed such that, as the rotation speed difference $\Delta V_W$ is increased, the first front tire wheel distributing torque $T_{q1}$ is increased. Thus, no effect of the feedback control execution on the driving force distribution control during the vehicular start is given.

Although, in the embodiment, the present invention is applicable to the four-wheel drive vehicle based on the rear tire wheel driven vehicle, the present invention is also applicable to the four-wheel drive vehicle based on the front tire wheel driven vehicle and having the transfer clutch mechanism.

Although, in the embodiment, the vehicle body speed is derived from the rotation speed of one of the auxiliarily driven tire wheels (front tire wheel rotation speed), an appropriate filter may be used to filter the rotation speed signal of the auxiliarily driven tire wheels so as not receive the influence of the varied auxiliarily driven tire wheels due to the variation in the driving force distributed to the auxiliarily driven tire wheels on the vehicle body speed, or a pseudo vehicle speed (estimated vehicle speed) used in an anti-skid brake control system of the vehicle may alternatively be used as the vehicle body speed.

Although, in the embodiment, the fluid-type (fluid pressure driven) frictional (multi-plate) clutch is used as the clutch mechanism, the present invention is applicable to an electromagnetic clutch which can continuously distribute the driving force.

Although, in the embodiment, the control unit 58 is constituted by the microcomputer, an electronic circuitry having a counter, comparator, and/or electronic switch may be used as the control unit.

The working fluid used to bias the variable clutch may include oil, water (liquid), or gas such as air.

The rotation output of the engine may be used as the rotation drive source of the oil pump 35c in place of the DC motor.

Figure 9:
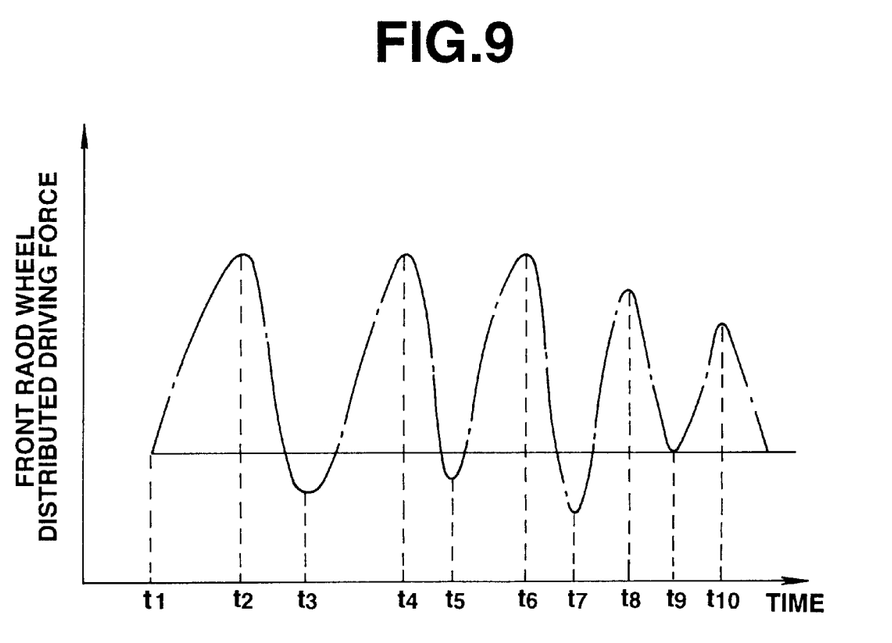
FIG. 9 is an explanatory timing chart indicating control hunting and no control hunting in cases where the correction of the first front tire wheel distributing torque is not carried out and is carried out.

A dot-and-dash line of FIG. 9 shows the undesirable result of the feedback control of the rate of the distribution of the driving force to the front tire wheels without correction of the first front tire wheel distributing torque $T_{q1}$ at the step S7 of FIG. 4.

That is to say, when the vehicle is running at the speed exceeding 40 km/h, with the tire wheels having radii different from those of the originally equipped tire wheels mounted as either of the front or rear tire wheels, and the time has reached to $t_1$, the front tire wheel distributing torque is set so as to be significantly increased, since the rotation speed difference $\Delta V_W$ between the front and rear tire wheels becomes increased due to the mount of the difference radius tire wheels described above. Since, the engaging force of the frictional clutch is signficantly increased the front tire wheel distributing torque soon indicates its local maximum at a time $t_2$. At this time $t_2$, the rotation speed difference $\Delta V_W$ indicates a low value due to the increase in the front tire wheel rotation speed $V_{WF}$, so that the front tire wheel distributing torque is set and controlled to becomes, reduced, and the engaging force of the frictional clutch becomes small. Soon thereafter, the torque to the front tire wheels indicates a local minimum value at a time $t_3$. In turn, since the rotation speed difference $\Delta V_W$ indicates a high value along with the decrease in the front tire wheel rotation speed, the front tire wheel distributing torque is again signficantly increased so as to become a local maximum value at a time $t_4$, and the frictional clutch engaging force is accordingly increased.

As described with reference to the dot-and-dash line of FIG. 9, when the feedback control of the driving force distribution based on the rotation speed difference between the front and rear tire wheels with different radius tire wheels mounted as the front or rear tire wheels is executed, the control hunting occurs such that the front tire wheel torque indicates the local maximum values at the times of $t_2$, $t_4$, $t_6$, and $t_8$, and the front tire wheel distributing torque indicates the local minimum values at the times of $t_3$, $t_5$, $t_7$, and $t_9$.

During the occurrence of the control hunting, the engaging force of the frictional clutch is significantly increased and decreased so that the vibration (oscillation or fluctuation) in the frictional clutch 37 is developed.

What is claimed is:

1. A control apparatus for a four-wheel drive vehicle, said four-wheel drive vehicle having mainly driven tire wheels which are either one of front tire wheels or rear tire wheels and auxiliarily driven tire wheels which are the others of either the front tire wheels or the rear tire wheels, said control apparatus comprising:

driving force distribution adjustment mechanism having a frictional clutch arranged for receiving a control signal according to which an engaging force thereof is controlled so that a distribution of a driving force from a vehicular engine to said mainly driven tire wheels and to said auxiliarily driven tire wheels is carried out;

a first sensor arranged for detecting a rotation speed of one of the mainly driven tire wheels;

a second sensor arranged for detecting a rotation speed of one of the auxiliarily driven tire wheels;

a third sensor arranged for detecting a running speed of the vehicle; and a control unit arranged for determining a tire wheel rotation speed difference in the rotation speed of the one mainly driven tire wheel detected by said first sensor from that of the one auxiliarily driven tire wheel detected by said second sensor, setting a rate of distribution of the driving force between the mainly driven tire wheels and the auxiliarily driven tire wheels on the basis of the determined difference in the rotation speed of the tire wheel so that as the determined difference becomes increased, the rate of distribution of the driving force to the auxiliarily driven tire wheels becomes increased, outputting a control signal indicating the set rate of the distribution toward the frictional clutch so as to control the engaging force of the frictional clutch on the basis of the set rate of distribution of the driving force to the auxiliarily driven tire wheels, and modifying the set rate of the distribution of the driving force to the auxiliarily driven tire wheels according to the detected running speed of the vehicle, wherein said control unit sets a first reference running speed ($V_{WF1}$) exceeding a vehicular low running speed and modifies the set rate of the distribution so that the driving force distributed to the auxiliarily driven tire wheels is maintained constantly at its minimum limit when the vehicle is running at a speed equal to or above the first reference running speed.

2. A control apparatus for a four-wheel drive vehicle as claimed in claim 1, wherein said mainly driven tire wheels are the rear tire wheels and said auxiliarily driven tire wheels are the front tire wheels and said third sensor comprises the second sensor arranged for detecting the front tire wheel rotation speed.

3. a control apparatus for a four-wheel drive vehicle as claimed in claim 2, wherein said control unit includes a setter for setting a first front tire wheel distributing torque ($T_{q1}$) as the rate of the distribution of the driving force to the front tire wheels according to the determined difference in the rotation speed between the front and rear tire wheels.

4. A control apparatus for a four-wheel drive vehicle as claimed in claim 3, wherein said control unit sets the first front tire wheel distributing torque ($T_{q1}$) to a relatively large predetermined value ($T_{q11}$) such that the rate of the distribution of the driving force between the front and rear tire wheels is 50:50, when said determined difference ($\Delta V_w$) is positive ($\Delta V_W = V_{WR} - V_{WF}$) and is in excess of a first predetermined threshold ($+\Delta V_{W1}$), said control unit increases the first front tire wheel distributing torque ($T_{q1}$) linearly from zero to the relatively large predetermined value ($T_{q11}$), when the determined difference ($\Delta V_W$) falls between zero and the first predetermined threshold ($+\Delta V_{w1}$), sets the first front tire wheel distributing torque ($T_{q1}$) to a relatively small predetermined value ($T_{q12}$) when the determined difference ($\Delta V_W$) is negative and is in excess of a second predetermined threshold ($-\Delta V_{W2}$), increases the first front tire wheel distributing torque ($T_{q1}$) linearly from zero to the relatively small predetermined value ($T_{q12}$) when the determined difference ($\Delta V_W$) falls in a speed range between a third predetermined threshold ($-\Delta V_{W1}$) whose absolute value is smaller than the second predetermined threshold ($-\Delta V_{W2}$) and sets the first front tire distributing torque ($T_{q1}$) to zero when the determined difference ($\Delta V_W$) falls in a speed range between zero and the third predetermined threshold ($-\Delta V_W$).

5. A control apparatus for a four-wheel drive vehicle as claimed in claim 4, wherein said control unit modifies the first front tire wheel torque ($T_{q1}$) so as to be reduced to a relatively low predetermined value ($T_{q13}$) when the detected running speed ($V_{WF}$) is equal to or above the first reference speed.

6. A control apparatus for a four-wheel drive vehicle as claimed in claim 5, wherein said control unit modifies the first tire wheel torque ($T_{q1}$) so as to be reduced to another relatively low predetermined value ($T_{q14}$) which is lower than the relatively low predetermined value ($T_{q13}$) when the detected running speed of the vehicle ($V_{WF}$) is in excess of a second reference speed ($V_{WF2}$) which is higher than the first reference speed $V_{WF1}$).

7. A control apparatus for a four-wheel drive vehicle as claimed in claim 6, which further comprises a fourth sensor arranged for detecting a working fluid pressure in a reservoir of a fluid pressure source arranged for supplying the working fluid pressure to said frictional clutch and wherein said control unit sets a second front tire wheel distributing torque ($T_{q2}$) according to the detected working fluid pressure T.

8. A control apparatus for a four-wheel drive vehicle as claimed in claim 7, which further comprises a throttle valve opening angle sensor arranged for detecting an opening angle of an engine throttle valve and wherein said control unit determines whether the detected running speed of the vehicle ($V_{WF}$) is equal to or below a third reference speed which is below the reference speed, sets a third front tire wheel distributing torque ($T_{q3}$) according to the detected opening angle of the engine throttle valve when the front tire wheel speed is equal to or below the third reference value, and sets a reference front tire wheel distributing torque ($T_B$) as follows: $T_B = \text{MAX} (T_{q1}, T_{q2}, T_{q3})$.

9. A control apparatus for a four-wheel drive vehicle as claimed in claim 8, which further comprises a manually driven mode switch arranged for selectively switching between a first mode ($S_2$) in which the four-wheel drive vehicle is running in a two-wheel driven state and a second mode ($S_4$) in which the rate of the distribution of the driving torque between the front and rear tire wheels is automatically controlled between 0:100 and 50:50, and wherein said control unit sets a target front tire wheel distributing torque $T_q$ to $T_B$ when determining that the manually driven mode switch is switched to the second mode, outputs the value of the target front tire wheel distributing torque $T_q$ to a driver driving a pressure control valve so as to control a duty ratio (D/T) of a pulse signal to the pressure control valve in accordance with the control signal and the pressure control valve supplying the fluid pressure controlled in accordance with the control signal to an input port of a transfer casing having the frictional clutch so that the engaging force of the frictional clutch is controlled according to the fluid pressure supplied from the pressure control valve, thus the front tire wheel distributing torque being transmitted to become the target front tire wheel distributing torque $T_q$ set in the control unit.

10. A control apparatus for a four-wheel drive vehicle as claimed in claim 9, wherein said first reference speed ($V_{WF1}$) is approximately 40 Km/h.

11. A control apparatus for a four-wheel drive vehicle as claimed in claim 10, wherein said second reference speed ($V_{WF2}$) is approximately 120 Km/h and said third reference speed ($V_{WF3}$) is approximately 160 Kgm.

12. A control apparatus for a four-wheel drive vehicle as claimed in claim 11, wherein said relatively low predetermined front tire wheel distributing torque value ($T_{13}$) is approximately 20 kgm and said further relatively low predetermined front tire wheel distributing torque value ($T_{14}$) is approximately 15 Kgm.

13. A control apparatus for a four-wheel drive vehicle, said four-wheel drive vehicle having mainly driven tire wheels which are either one of front tire wheels or rear tire wheels and auxiliarily driven tire wheels which are the others of either the front tire wheels or the rear tire wheels, said control apparatus comprising:

driving force distribution adjustment mechanism having a frictional clutch arranged for receiving a control signal according to which an engaging force thereof is controlled so that a distribution of a driving force from a vehicular engine to said mainly driven tire wheels and to said auxiliarily driven wheels is carried out;

a first sensor arranged for detecting a rotation speed of one of the mainly driven tire wheels;

a second sensor arranged for detecting a rotation speed of one of the auxiliarily driven tire wheels;

a third sensor arranged for detecting a running speed of the vehicle; and a control unit arranged for determining a tire wheel rotation difference in the rotation speed of the mainly driven driven tire wheel to that of the auxiliarily driven tire wheel detected by said first and second sensors, setting a rate of the distribution of the driving force between the mainly driven tire wheels and the auxiliarily driven tire wheels on the basis of the determined difference in the rotation speed of the tire wheel so that as the determined speed difference becomes increased, the rate of the distribution of the driving force to the auxiliarily driven tire wheels becomes increased, outputting the control signal toward the frictional clutch so as to control the engaging force of the frictional clutch on the basis of the set rate of distribution of the driving force to the auxiliarily driven tire wheels, setting a first reference running speed ($V_{WF1}$) exceeding a vehicular low running speed, and modifying the set rate of the distribution so that the driving force distributed to the auxiliarily driven tire wheels is maintained constantly at its minimum value when the vehicle is running at a speed equal to or above the first reference running speed.

14. A control method for a four-wheel drive vehicle, said four-wheel drive vehicle having mainly driven tire wheels which are either one of front tire wheels or rear tire wheels and auxiliarily driven tire wheels which are the others of either the front tire wheels or the rear tire wheels and driving force distribution adjustment mechanism having a frictional clutch arranged for receiving a control signal according to which an engaging force thereof is controlled so that a distribution of a driving force from a vehicular engine to said mainly driven tire wheels and to said auxiliarily driven wheels is carried out, said control method comprising the steps of;

a) detecting a rotation speed of one of the mainly driven tire wheels;

b) detecting a rotation speed of one of the auxiliarily driven tire wheels;

c) detecting a running speed of the vehicle;

d) determining a tire wheel rotation speed difference from the rotation speed of the auxiliarily driven tire wheel to that of the mainly driven tire wheel;

e) setting a rate of the distribution of the driving force between the mainly driven tire wheels and the auxiliarily driven tire wheels on the basis of the determined difference in the rotation speed of the tire wheel so that as the determined difference becomes increased, the rate of the distribution of the driving force to the auxiliarily driven tire wheels becomes increased;

f) outputting the control signal toward the frictional clutch so as to control the engaging force of the frictional clutch on the basis of the set rate of distribution of the driving force to the auxiliarily driven tire wheels;

g) setting a first reference running speed ($V_{WF1}$) exceeding a vehicular low running speed; and h) modifying the set rate of the distribution so that the driving force distributed to the auxiliarily driven tire wheels is maintained constantly at its minimum limit when the vehicle is running at a speed equal to or above the first reference running speed.

* * * * *